(12) United States Patent
Teng

(10) Patent No.: US 6,722,043 B2
(45) Date of Patent: Apr. 20, 2004

(54) SIMPLE FAT SKIMMING LADLE

(76) Inventor: Eric Y. Teng, 12089 Gold Pointe La., Gold River, CA (US) 95670

( * ) Notice: Subject to any disclaimer, the term of this patent is extended or adjusted under 35 U.S.C. 154(b) by 63 days.

(21) Appl. No.: 10/115,646

(22) Filed: Apr. 3, 2002

(65) Prior Publication Data

US 2003/0188439 A1 Oct. 9, 2003

(51) Int. Cl.$^7$ ................................................ A47J 43/28
(52) U.S. Cl. ........................................ 30/324; D7/691
(58) Field of Search ...................... 30/141, 324, 326, 30/325, 327, 328; D7/691

(56) References Cited

U.S. PATENT DOCUMENTS

| | | | |
|---|---|---|---|
| 2,287,156 A | * | 6/1942 | White .................. 30/324 UX |
| 4,040,185 A | | 8/1977 | Jacobi |
| 4,839,965 A | | 6/1989 | Levie |
| 5,005,294 A | | 4/1991 | Roberts |
| 5,077,900 A | | 1/1992 | Jamentz |
| 5,084,177 A | | 1/1992 | Keene |
| 5,182,860 A | | 2/1993 | Kuhlman |
| 5,199,349 A | | 4/1993 | Hansen |
| 5,367,775 A | | 11/1994 | Tong et al. |
| 5,526,737 A | | 6/1996 | Betzen |
| 5,560,109 A | | 10/1996 | Lam |
| 5,894,668 A | | 4/1999 | Cooke |

FOREIGN PATENT DOCUMENTS

DE    4113337 A1 * 10/1991 ................. 30/324

* cited by examiner

Primary Examiner—Douglas D. Watts

(57) ABSTRACT

In accordance with the present invention a fat skimming ladle that is efficient and convenient to use for removal of fat and other floating debris off of cooked soup stock. This special purpose ladle retains the simple elegant look of a common soup ladle, and can just as convenient to be used. The conduit structure with inlet located at the interior bottom of the ladle bowl and outlet located behind the proximal end of the handle allows for a simple, elegant and greatly functional design.

7 Claims, 1 Drawing Sheet

SIMPLE FAT SKIMMING LADLE

BACKGROUND

1. Field of Invention

The present invention pertains to a kitchen utensil used for skimming fat or other floating debris from soup stock. Specifically, it pertains to a class of cookware commonly known as fat skimming ladle.

2. Description of Prior Art

Because of diet and health concerns, consumers nowadays tend to be adamant about reducing the fat content in their daily food intake. In general household cooking, the preparation of soup stock from fresh meat tend to retain all its fat content which would float to the top forming an oily layer. This fat should therefore be removed thoroughly and be discarded.

If no special gadget is available, the user would be forced to use a soup ladle to skim off the fat. This is unsatisfactory because proper skimming would take skillful manipulation of the ladle, and would need to be carried out many times throughout the cooking. Additionally, liquid stock would also be collected by the ladle although the user is only trying to skim off the fat. So in the process of getting rid of the fat, a little stock would also get discarded. Do it over many times during cooking to eliminate all the fat, then this little waste each time would become a major problem.

(For discussions hereinafter, "stock" refers to the liquefied fat and liquid mixture while "broth" refers to the cooked liquid excluding fat.) In view of this, some users choose to cool off the stock in the refrigerator, or by using ice cubes so fat can solidify for removal. Needless to say, such are very unsatisfactory and time-consuming methods.

There is a utensil called a gravy skimmer in the shape of an uncovered teapot having a spout that originates from the bottom of the beaker shaped container. A user may pour accumulated drippings (a mixture of fat and juice from meat) into the gravy skimmer. Then the juice from the meat will be poured out through the spout to be made into gravy leaving the lighter fat within the gravy skimmer to be disposed of. The gravy skimmer is suitable for its intended purpose of skimming fat off of drippings which is of only a small amount. For soup stock cooking, the volume of liquid involved would be much too much to be properly handled by a gravy skimmer.

It has been recognized early on that fat skimming of a liquid stock can most conveniently be done by using a ladle type of utensil. The idea is that a skimming ladle can used to quickly and conveniently collect only the fat for discarding. And if the ladle can also be used as a common soup ladle thus having dual purposes for the same device, then there would obviously be much more added convenience.

Many inventors in the past had made attempts at inventing a functional fat skimming ladle. Existing patents of fat skimming ladles on file at the USPTO include the following:

U.S. Pat. No. 4,040,185 presents a complicated design having an additional vessel internal to the ladle;

U.S. Pat. No. 4,839,965 Levie proposes a ladle construction similar to the skimmer described, having a removable gate separating the spout from the bowl section of the ladle;

U.S. Pat. No. 5,005,294 Roberts presents a ladle having very similar construction to that of the Levie patent above;

U.S. Pat. No. 5,077,900 Jamentz presents a ladle having ports for collection of fat;

U.S. Pat. No. 5,084,177 Keene presents a ladle having fat collection "domes" within the ladel;

U.S. Pat. No. 5,182,860 Kuhlman presents a ladle having a trigger release on the handle for fat collection;

U.S. Pat. No. 5,199,349 Hansen presents a ladle having a inlet tongue and outlet holes on opposite sides;

U.S. Pat. No. 5,367,775 Tong et al presents a ladle having a movable inner structure for liquid guide;

U.S. Pat. No. 5,526,737 Bentzen presents a ladle having a cone shaped structure for collecting fat;

U.S. Pat. No. 5,560,109 Lam presents a ladle having a double vessel construction.

U.S. Pat. No. (584,668 Cooke presents a general-use ladle designed for pouring from the rear end—included here in prior art citation because of its relevance to rear-pouring design ladles.)

By and large the above designs are much too complicated for the intended simple purpose of selectively collecting fat. And by and large they don't even work any better than using a common soup ladle. The near total failure of this type of gadget is exemplified by the fact that no fat skimming ladle is offered by any of the major national chain stores despite its apparent great usefulness.

A careful search on the Internet has revealed only one company Profi-Plus that has produced a fat skimming ladle that has met any degree of commercial success. An early version of their fat skimming ladle is of a design that has holes punched out from the periphery of a common soup ladle. This version of the gadget functions no better than a common soup ladle and has since been abandoned. Their latest fat skimming ladle has a construction that uses the same bottom draining principle similar to the gravy skimmer previously described to drain off the liquid stock leaving fat behind. In other words, the Profi-Plus unit is essentially a gravy skimmer made in the shape of a container bowl having a long handle. The outlet spout is located to one side of the bowl occupying part of the brim.

As in the gravy skimmer, this design would work in selectively draining out the liquid back into the soup stock leaving fat behind for disposal. However, this kind of fat skimming ladle is unnecessarily difficult to use in that having the outlet spout located at the brim of the bowl would mean the user would always have to avoid having the soup stock (mixture of liquid fat and broth) flowing into the container bowl by way of the spout. So in order to avoid the spout, the unit is designed have a horizontal opening in the shape of a post box opening that accepts the flow of soup stock mixture. This opening is located at a level slightly below the brim of the bowl. Unfortunately, to help avoid the spout, the design is in a way forcing the user to direct soup stock flow to enter the bowl only through this opening. Such requirements of avoiding the spout and directing flow only through the opening unnecessarily complicates the fat skimming process. In addition to this inconvenience, having the spout prominently out in front and to a side of the ladle, along with the prominent "post box" opening would only serve to discourage users from using this ladle as a common soup ladle effectively eliminating one of the greatest advantages that a dual-purpose fat skimming ladle would otherwise offer.

The present invention uses the same bottom-feeding principal as common gravy skimmers. But by having the outlet spout located behind the proximal end of the handle, all the shortcomings of the Profi-Plus ladle is eliminated. This design allows soup stock flow over any part of the brim into the container bowl. So ladle handling can be naturally carried out with no purposeful manipulation required. In addition, the ladle with this design would also retain the simple and elegant look and easy function of a common soup ladle making this a true dual-purpose fat skimming ladle.

OBJECTS AND ADVANTAGES

The present invention has achieved the ultimate simplicity in design with excellent functionality that enables it to function as an efficient, easy to use fat skimmer. It also has the same simple and elegant look of a common soup ladle, and can be conveniently used as one.

It is a first objective of this invention to provide a utensil that provides for an easy and thorough removal of fat and other floating debris on the surface of soup stock while it is still being cooked.

It is a second objective of this invention to provide a utensil that can accomplish the above with little waste;

It is a third objective of this invention to provide a utensil that has the dual function of being able to be used as a common soup ladle with essentially the same elegant look and the same easy functions;

Additional advantages from a manufacturer's standpoint include: simple one-piece construction; a highly innovative product that is far superior to other competitive products on the market in every aspect and is extremely simple and economical to produce.

Other objects of the invention will in part be obvious and will in part appear hereinafter.

The invention accordingly comprise the device possessing the features, properties, and the relation of components which are exemplified in the following detailed disclosure and the scope of the application of which will be indicated in the appended claims.

For a fuller understanding of the nature and objects of the invention reference should be made to the following detailed description and its accompanying drawings.

BRIEF SUMMARY OF THE INVENTION

In accordance with the present invention a kitchen fat-skimming ladle comprise of a handle, a container bowl, a conduit that drains from an inlet located at the interior bottom of the container to an outlet located behind the handle at its proximal end. This utensil uses the effective bottom draining principle of a common gravy skimmer and returns liquid stock to the pot while leaving fat behind for disposal. This ladle avails the entire brim of the ladle bowl to be used for scooping out the soup stock mixture enabling very natural handling. The liquid stock can be drained back into the pot easily by tipping the ladle backwards leaving fat behind. The conduit merges with the retainer bowl and handle, and is completely hidden from view. This dual-purpose ladle has the same simple elegant look and easy functioning of a common soup ladle.

DETAILED DESCRIPTION OF THE INVENTION (PREFERRED EMBODIMENT)

Figure 1:
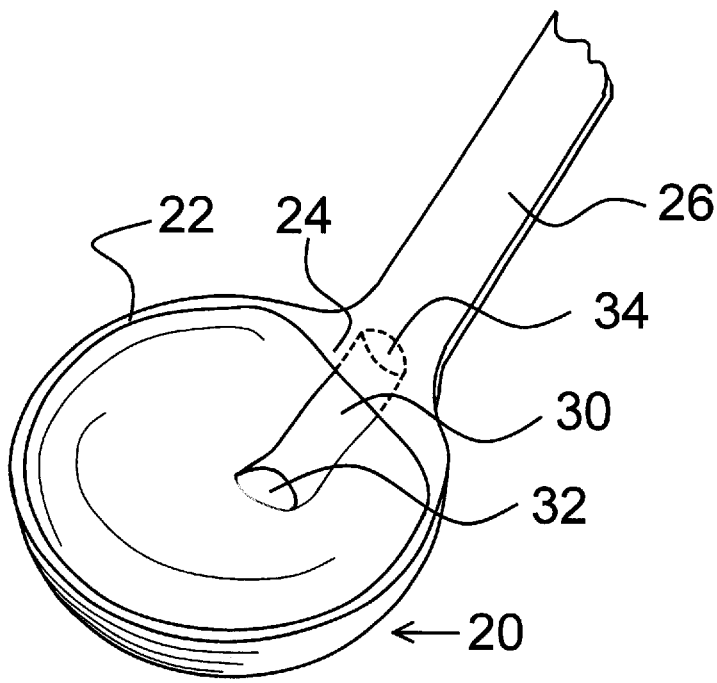
FIG. 1 Perspective view of the preferred embodiment of the fat skimming ladle according to the invention FIG. 2 Cut-away view of the fat skimming ladle in operation

A typical and preferred embodiment of the fat skimming ladle of this invention is illustrated in FIG. 1. This ladle can be constructed either of injection molded thermoplastic such as ABS or nylon, or can be constructed of a suitable metal such as stainless steel. For a ladle constructed of plastic, a transparent, dishwasher safe material such as Terlux produced by BASF would be a good choice because the user would be able to visually see the liquid being drained out.

The physical construction of this ladle is quite similar to that of a common soup ladle in that it mainly consists of a container bowl 20 for holding liquid, and a long ladle handle 26. In addition to the bowl and the handle, this ladle has a liquid conduit 30 having an inlet 32 located at the internal bottom of the bowl. This conduit has an outlet 34 external to the bowl immediately below the handle, and is about at level with the brim 22 of the bowl.

Other variations from the above may be possible to further improve the basic design. For example:

1. A liquid level elevation dam 24 which is an extension of the brim of the bowl can be included on the front side of the handle about at level with the brim of the bowl for elevating level of liquid in container bowl further above the conduit outlet (see discussion in product operation);
2. The conduit can be widened for easier cleaning, or be of a different cross sectional shape that it can be better described as an open chamber;
3. The bottom of the bowl can be flat enabling the edge of the bowl bottom below the handle to be always at the lowest level despite tipping of the ladle (see discussion in product operation).

Reference Numerals in Drawings

20 Container bowl
22 Brim of bowl
24 Liquid level elevation dam
26 Ladle handle
30 Conduit
32 Conduit inlet
34 Conduit outlet
40 Fat layer
42 Broth layer
44 Curved space under liquid level elevation dam
46 Broth draining from conduit outlet

OPERATION AND UTILIZATION

During use, the ladle is first slightly submerged into the cooked soup stock which has a top layer of fat and other floating debris, and a bottom layer of liquid stock. The soup stock mixture will then flow into the bowl. As the bowl is filled with this mixture, the heavier liquid stock will collect at the bottom with fat floating on top again forming two distinct layers inside the container bowl. The ladle is then tipped backward such that the top of the fat layer will occupy the curved space 44 under the liquid level elevation dam 24.

Figure 2:
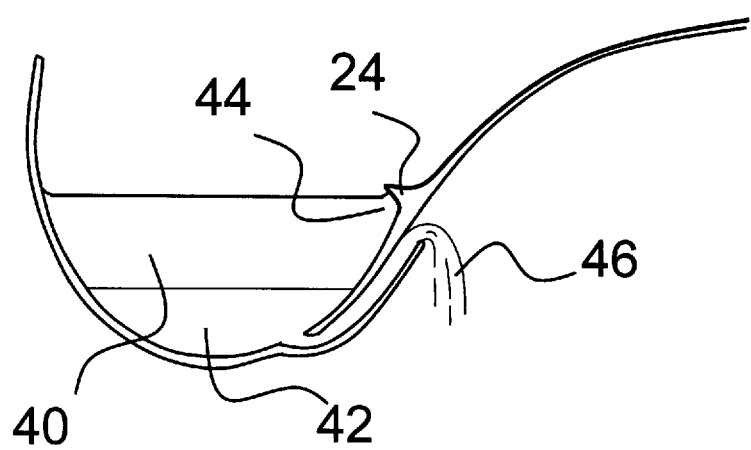

From the drawing FIG. 2 and a consideration of the hydraulics involved, it can be seen that the broth will be drained out first from the conduit outlet. By keeping the ladle tipped this way, all the broth inside the bowl can be drained and returned to the pot leaving only fat behind in the retainer bowl.

Depending on the amount of fat left in the ladle bowl, the user may either continue to collect more stock mixture and repeat the action; or dispose of the collected fat. Thus the fat skimming procedure using this device can be seen to be very simple, efficient and thorough.

By having a conduit outlet located at the proper level, the outlet can always be kept at a level below the brim of the bowl while the ladle is being tipped with or without the liquid level elevating dam. However, by slightly extending the brim of the bowl across the proximal end of the handle forming the liquid level elevation dam, the liquid level of stock mixture in the bowl would be further elevated compared to the conduit outlet enabling even faster draining action while effectively eliminating avoiding fat spill over the brim of the bowl.

Note that if the bowl has a hemispherical bottom, the conduit inlet will not be kept constantly at the lowest point of the bowl as the ladle is tipped back. This normally should not be a problem because the shift of the lowest point of the bowl can only be slight so only the heavier liquid stock will get drained out in either case. However, if desired, the bowl can be constructed of a flat bottom so the conduit inlet located at the edge of the bowl below the handle will always be at the lowest level regardless of how the ladle is tipped further assuring no fat is drained out of the conduit.

For esthetic considerations, the conduit is usually kept somewhat narrow so its profile can unobtrusively merge with the bowl so that the fat skimming ladle can look quite identical to a common soup ladle. However, the narrow conduit may be more difficult to clean. An alternative to the narrow conduit is to widen the conduit so it would having a larger cross sectional area. Another alternative is to have a removable piece forming part of the conduit which can be inserted for use, and removed for washing. This design change is a trivial task for those skill in the art.

CONCLUSION, RAMIFICATIONS, AND SCOPE OF INVENTION

Thus the reader will see that the fat skimming ladle of the invention provides a simple, inexpensive, efficient and versatile, compact and elegant utensil suitable for both fat skimming and general soup stock use that is vastly superior to the best of the prior art, and fills a definite need for such a gadget in the market.

While my above description contains many specificities, these should not be construed as limitations on the scope of the invention, but rather as an exemplification of one preferred embodiment thereof. Many other variations are possible. For example: the shape of the bowl can be changes, the handle can be lengthened or shortened, the conduit can be of a simple narrow tubes with round cross section, or be wider allowing easy cleaning; or having a crescent shaped cross section hugging the side of the bowl so the conduit will effectively be a separate section of the bowl, etc.

Accordingly, the scope of the invention should be determined not by the embodiments illustrated, but by the appended Claims and their legal equivalents.

What is claimed is:

1. A kitchen utensil comprising:

a) an elongated handle having a distal end and a proximal end;

b) a liquid container bowl having an internal side and an external side; said container bowl being connected to said proximal end of said handle;

c) a liquid conduit having an inlet and an outlet; said inlet being located substantially at the bottom of said container bowl on its said internal side; said outlet being located substantial at said proximal end of said handle on said external side of said container bowl;

whereby a mixture of liquid stock within said container bowl having different densities may be separated by draining through said conduit.

2. Kitchen utensil of claim 1 further including a liquid level elevating dam located substantially at said proximal end of said handle on said interior side of said container bowl.

3. Kitchen utensil of claim 1 wherein said conduit has narrow cross-section.

4. Kitchen utensil of claim 1 wherein said conduit has large cross section forming a separate open chamber.

5. Kitchen utensil of claim 1 wherein part of said conduit is removably attached to said container bowl.

6. Kitchen utensil of claim 1 wherein said container bowl is substantially hemispherical in shape.

7. Kitchen utensil of claim 1 wherein said container bowl has a substantially flat bottom.

* * * * *